US008903932B2

(12) United States Patent
Anderson et al.

(10) Patent No.: US 8,903,932 B2
(45) Date of Patent: *Dec. 2, 2014

(54) SYSTEMS AND METHODS FOR VIDEO MESSAGING AND CONFIRMATION

(71) Applicant: NetBriefings, Inc., St. Paul, MN (US)

(72) Inventors: Gary Anderson, Arden Hills, MN (US); Roger Alan Anderson, Lino Lakes, MN (US); Yonglin Li, Oakdale, MN (US)

(73) Assignee: NetBriefings, Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/037,004

(22) Filed: Sep. 25, 2013

(65) Prior Publication Data
US 2014/0095636 A1    Apr. 3, 2014

Related U.S. Application Data

(63) Continuation of application No. 13/580,130, filed as application No. PCT/US2011/046848 on Aug. 5, 2011, now Pat. No. 8,572,196.

(60) Provisional application No. 61/373,154, filed on Aug. 12, 2010.

(51) Int. Cl.
*G06F 15/16* (2006.01)
*H04L 12/58* (2006.01)
*H04N 21/482* (2011.01)
*H04N 21/4786* (2011.01)

(52) U.S. Cl.
CPC ............ *H04L 51/34* (2013.01); *H04N 21/4826* (2013.01); *H04N 21/4786* (2013.01)
USPC ............................. 709/206; 709/205; 715/751

(58) Field of Classification Search
CPC ....... H04L 21/472; H04L 12/58; H04L 51/34; G06Q 10/107; H04N 21/4826; H04N 21/4786
USPC ........... 709/206, 226, 205; 705/10; 379/67.1; 725/35; 715/751
See application file for complete search history.

(56) References Cited

U.S. PATENT DOCUMENTS 6,477,708 B1    11/2002  Sawa
6,816,904 B1 *  11/2004  Ludwig et al. ................ 709/226
(Continued)

FOREIGN PATENT DOCUMENTS

WO    WO-2012021418 A1    2/2012

OTHER PUBLICATIONS

"U.S. Appl. No. 13/580,130, Non Final Office Action mailed Nov. 20, 2012", 11 pgs.
(Continued)

*Primary Examiner* — Jungwon Chang
(74) *Attorney, Agent, or Firm* — Schwegman Lundberg & Woessner, P.A.

(57) ABSTRACT

Various embodiments illustrated and described herein include systems, method, and software for video messaging generation, sending, view tracking, and automated follow-up. Such embodiments provide mechanisms allowing users to engage with recipients and to track and collect recipient information and their tendencies in order to increase communication effectiveness. Some embodiments include sending messages with links to video though various messaging platforms. For example, some embodiments include sending electronic messages via email or via an online hosted computer application system for delivery by the online hosted computer application. Examples of the online hosted computer applications include social networking websites such as FACEBOOK®, TWITTER®, and LINKEDIN®. Messages may be generated and sent by a video messaging system directly; through integration of a customer relationship management application with a video messaging system; through an email, text message, social networking message that includes a link to a video message; and other mechanisms.

9 Claims, 14 Drawing Sheets

(56) References Cited

U.S. PATENT DOCUMENTS

| | | | |
|---|---|---|---|
| 7,904,922 B1* | 3/2011 | Haberman et al. | 725/35 |
| 8,572,196 B2* | 10/2013 | Anderson et al. | 709/206 |
| 2002/0056119 A1 | 5/2002 | Moynihan | |
| 2002/0112005 A1* | 8/2002 | Namias | 709/206 |
| 2002/0131561 A1* | 9/2002 | Gifford et al. | 379/67.1 |
| 2002/0172333 A1 | 11/2002 | Gross | |
| 2004/0014456 A1 | 1/2004 | Väänänen | |
| 2005/0027781 A1 | 2/2005 | Curry et al. | |
| 2005/0086311 A1* | 4/2005 | Enete et al. | 709/206 |
| 2007/0067407 A1 | 3/2007 | Bettis et al. | |
| 2007/0113101 A1 | 5/2007 | Levasseur et al. | |
| 2008/0275762 A1* | 11/2008 | Cutler et al. | 705/10 |
| 2008/0320509 A1 | 12/2008 | Gustafson | |
| 2009/0292814 A1 | 11/2009 | Ting et al. | |
| 2010/0094878 A1 | 4/2010 | Soroca et al. | |
| 2010/0130174 A1 | 5/2010 | Venkob et al. | |
| 2010/0250477 A1 | 9/2010 | Yadav | |
| 2012/0317218 A1 | 12/2012 | Anderson et al. | |

OTHER PUBLICATIONS

"U.S. Appl. No. 13/580,130, Notice of Allowance mailed Jun. 25, 2013", 10 pgs.

"U.S. Appl. No. 13/580,130, Response filed Apr. 18, 2013 to Non Final Office Action mailed Nov. 20, 2012", 24 pgs.

"International Application No. PCT/US2011/046848, International Preliminary Report on Patentability mailed Feb. 21, 2013", 7 pgs.

"International Application No. PCT/US2011/046848, International Preliminary Report on Patentability mailed Jul. 23, 2012", 16 pgs.

"International Application No. PCT/US2011/046848, International Search Report mailed Jan. 5, 2012", 3 pgs.

"International Application No. PCT/US2011/046848, Written Opinion mailed Jan. 5, 2012", 5 pgs.

"International Application No. PCT/US2011/052417, Corrected International Preliminary Report on Patentability mailed Apr. 10, 2013", 16 pgs.

* cited by examiner

SYSTEMS AND METHODS FOR VIDEO MESSAGING AND CONFIRMATION

RELATED APPLICATION AND PRIORITY CLAIM

This application is a continuation application which claims the benefit of priority to U.S. patent application Ser. No. 13/580,130, filed on Aug. 20, 2012 which is a nationalization under 35 U.S.C. 371 of PCT/US2011/046848, filed Aug. 5, 2011, published as WO 2012/021418, publication date Feb. 16, 2012, which claims the benefit of priority, under 35 U.S.C. Section 119(e) to U.S. Provisional Patent Application Ser. No. 61/373,154 filed on Aug. 12, 2010, the benefit of priority of which is claimed hereby, and each of which are incorporated herein by reference in their entirety.

BACKGROUND INFORMATION

When sending messages, it is often desired to know when the message has been received and viewed. While email systems include functionality to send received and read receipts to a sender, video messaging systems do not include such mechanisms. Further, modern electronic communication may occur via disparate platforms such as text messaging, social networking computer applications such as FACEBOOK®, TWITTER®, LINKEDIN®, and other platforms. These messaging platforms generally do not provide mechanisms by which a sender, either a human sender or a software application sender, will be notified when an intended recipient views a message.

DETAILED DESCRIPTION

Figure 1:
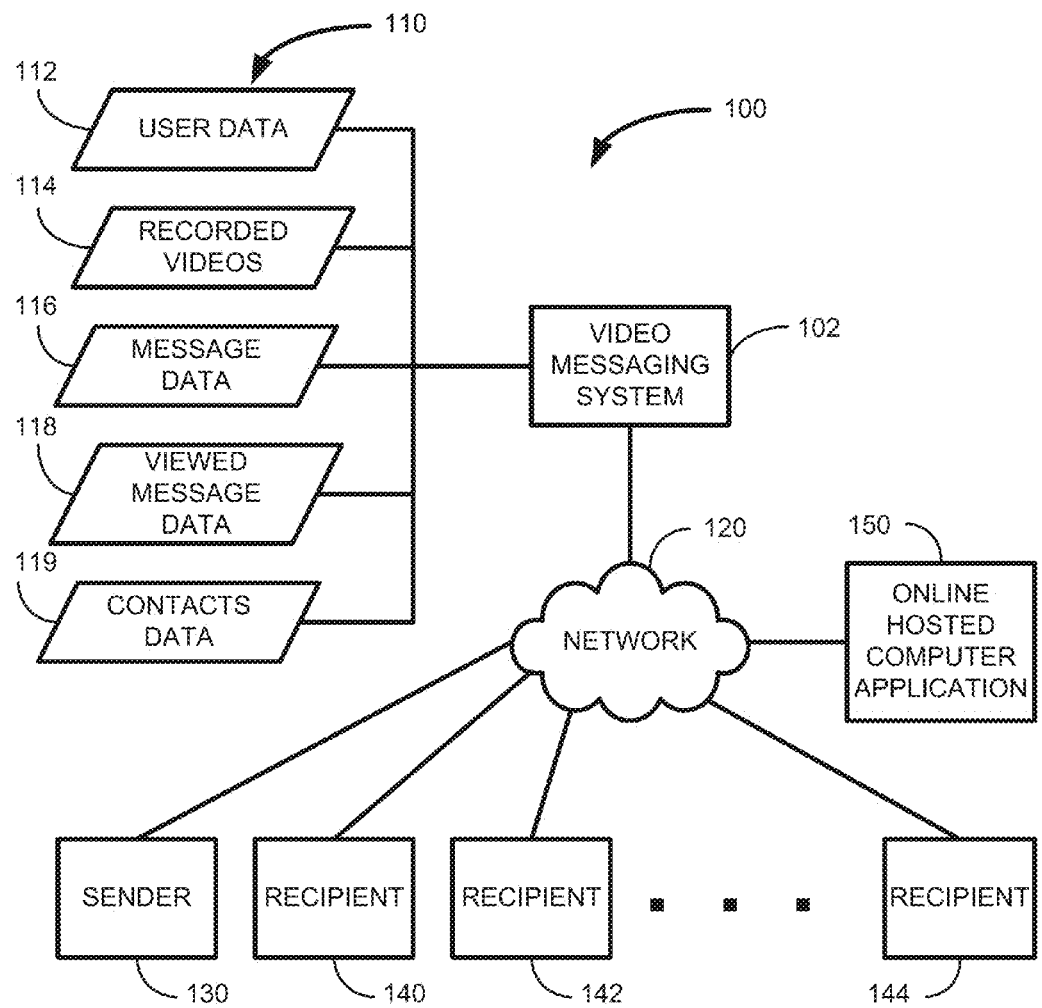
FIG. 1 is a logical block diagram of a system architecture, according to an example embodiment.

Various embodiments illustrated and described herein include systems, method, and software for video messaging generation, sending, view tracking, and automated follow-up. Such embodiments provide mechanisms allowing users to engage with recipients and to track and collect recipient information and their tendencies in order to increase communication effectiveness. Some embodiments include sending messages with links to video though various messaging platforms. For example, some embodiments include sending electronic messages via email or via an online hosted computer application system for delivery by the online hosted computer application. Examples of the online hosted computer applications include social networking websites such as FACEBOOK®, TWITTER®, and LINKEDIN®. Messages may be generated and sent by a video messaging system directly; through integration of a customer relationship management application with a video messaging system; through an email, text message, social networking message that includes a link to a video message; and other mechanisms.

Video messages may be viewed by selecting a link included in a received message. When the link is received via email, a web browser or app may be launched by a computing device of the recipient through which the video message may be viewed. In other embodiments, such as when the video message link is received in a social networking message, selection of the link may cause the video message to be retrieved and presented directly in the context of the social network website or app in use.

When a video message is selected by a recipient for viewing, the video messaging system may generate and send a message to the sender of the video message indicating the particular viewer has viewed the video message. This message may be generated by the video messaging system based on a known recipient associated with a unique link the recipient selected to view the message.

The request for the video by the recipient also typically includes additional data regarding a system the requesting recipient is utilizing to view the video message, such as a web browser and version, an Internet service provider utilized to access the Internet, a software application from which the video message was received, a date and time of the request, and other information that is readily available when a Universal Resource Locator request is received, as is readily know to a person of skill in the relevant art. This received information, in some embodiments, may be stored and mined by one or more processes to determine optimal parameters for sending future video messages to that particular recipient to increase communication effectiveness. For example, over time if a tendency is identified that the recipient views messages through a particular social networking site during a particular time of day, the video messaging system may set parameters for communicating with that particular recipient to increase the likelihood sent messages will be viewed. These and other embodiments are illustrated and described herein.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100 architecture, according to an example embodiment. The system 100, in some embodiments, includes a video messaging system 102 connected to a network 120 to receive video messages from a sender 130 that are sent to one or more recipients 140, 142, 144. Although only one sender 130 and three recipients 140, 142, 144 are illustrated, other embodiments may include more senders 120 and different numbers of recipients 140, 142, 144. Further, the sender 130 may also be a recipient of video messages sent by the recipients 140, 142, 144. As such, the recipients 140, 142, 144 may also be senders of video messages. The sender 130 and recipients 140, 142, 144 represent computing devices of human users, although the sender 130 may in some embodiments be a logical user. The computing devices may include personal computers, handheld computing devices such as smartphones, tablet computing devices, set top boxes and smart televisions, and other computing devices.

In some embodiments, the system 100 may also include one or more online hosted computer applications 150. Example online hosted computer applications 150 may include SALESFORCE.COM®, LINKEDIN®®, TWITTER®, FACEBOOK®, and other online hosted computer applications with which the video messaging system may be integrated or used in parallel.

The video messaging system 102 includes a data storage facility 110 which stores data. The data storage facility 110 may store data with regard to user 112, recorded videos 114, messages 116, viewed messages 118, and contacts 119. The user data 112 is data with regard to authorized users of the video messaging system 102 for sending of video messages, such as sender 130. The recorded videos data 114 includes videos that are uploaded and stored to the video messaging system 102, generated through user interaction with the video messaging system 102, or as may be linked to in stored recorded video data 114. The message data 116 generally includes data sent or to be sent along with a video message such as text of an email message to inform a recipient 140, 142, 144 of the video message that has been sent. The message data 116 may also include data identifying who sent the message, when the message was sent or is scheduled to be sent, when and if the message has been received and by whom, and the like. The viewed message data 118 may include data identifying who the message has been sent to and whether they have viewed the video message, system properties of recipients 140, 142, 144 that have viewed the message including information about a program utilized to request the video message, and other data that may be received in an a network request, such as an HTTP request, as is readily known by those of skill in the relevant art.

The video messaging system 102 provides interfaces through which the sender 130 may generate messages to send to recipients 140, 142, 144. The video messaging system 102 when used to generate messages may include functionality to generate a video to include in a message. Alternatively, the video messaging system 102 may be used to upload a video to include in a message. In either case, the video is not actually sent in the message. The video is stored in the stored recorded video data 114 and a link to the particular video is provided in an electronic message that is sent to a recipient 140, 142, 144. By including a link to the stored video in the electronic message, the video can only be seen by selecting the link. This facilitates tracking of video message viewing by recipients 140, 142, 144.

Through tracking of video message viewing, many opportunities are opened for users, such as sender 130. For example, when the video messaging system 102 is used for marketing purposes, contacts with prospective and existing customers can be tracked in real time by configuring the video messaging system 102 to send the sender 130 an email upon a recipient 140, 142, 144 viewing a video message. Further, some embodiments may include integration with an online hosted computer application 150 that provides customer relationship management (CRM) functionality. In such embodiments, task activities of sending messages, following up on a sent message, and other activities can be generated in the online hosted computer application upon sending a video message via the video messaging system 102. Further, the task activities can be closed or information therein added to upon viewing of a message detected by the video messaging system 102. In some embodiments, the messages may be generated and sent from the online hosted computer application 150 through direct integration with the video messaging system 102 or by including links to video messages stored within the video messaging system 102 in messages send via the online hosted computer application 150.

Messages sent via the video messaging system 102 generally include a textual portion and a video portion. The textual portion of a message may include one or more of text, graphics, images, and other multimedia content that may be included in an electronic communication notifying the recipient of the video message. The textual portion will also include a link, such as a hyperlink, to the video portion. The video portion is a recorded video for the recipient to view through selection of the link. The video portion is stored by the video messaging system 102 or the video messaging system may provide a redirect to a location where the video may be downloaded.

Messages sent via the video messaging system 102 may be sent via a number of different messaging platforms. For example, the messages may be sent via email, text messages (e.g., SMS, MMS, etc.), chat messages, social media online hosted computer applications 150 (LINKEDIN®®, TWITTER®, FACEBOOK®, etc.), and other messaging platforms.

In an example embodiment, the sender 130 may utilize the video messaging system 102 to generate a message to be sent to one or more recipients 140, 142, 144. The sender 130 may upload a video to the video messaging system 102 or interact with a video recording function of the video messaging system to generate and store the video. Next, the sender 130 may generate a message to send to the recipients, select a video to include by inserting a link to the video in the message, and selected the recipients to receive 140, 142, 144 the message. The sender 130, in some embodiments, may select a messaging platform for sending the message to the recipients 140, 142, 144, either individually or all recipients. The message will then be sent to the recipients 140, 142, 144. However, prior to sending the message, the video messaging system modifies the link in each message that is sent to be directly associated with at least one of the individual recipient 140, 142, 144 for the message and the video.

Upon receipt of the message, a recipient 140, 142, 144 will view the message and select the link to the video. The link will direct the recipient to access the stored video in a storage location accessible via the network 120. For example, the link may direct the video request to a video stored in the stored recorded video data 114 of the video messaging system 102. The video messaging system 102, upon receipt of the video request will record receipt of the request with regard to the requesting recipient 140, 142, 144. In some embodiments, the sender 130 will then be notified of the viewing of the message by the particular recipient 140, 142, 144. The sender 130 may be notified via email or via another messaging platform.

While this embodiment describes interacting directly with the video messaging system 102, other embodiments may leverage the functionality of the video messaging system 102 through system integration with an online hosted computer application 150 or other computer application. Such integrated embodiments allow senders to interact in whole or in part with the integrated system in sending messages. Such embodiments are described further below.

Figure 2:
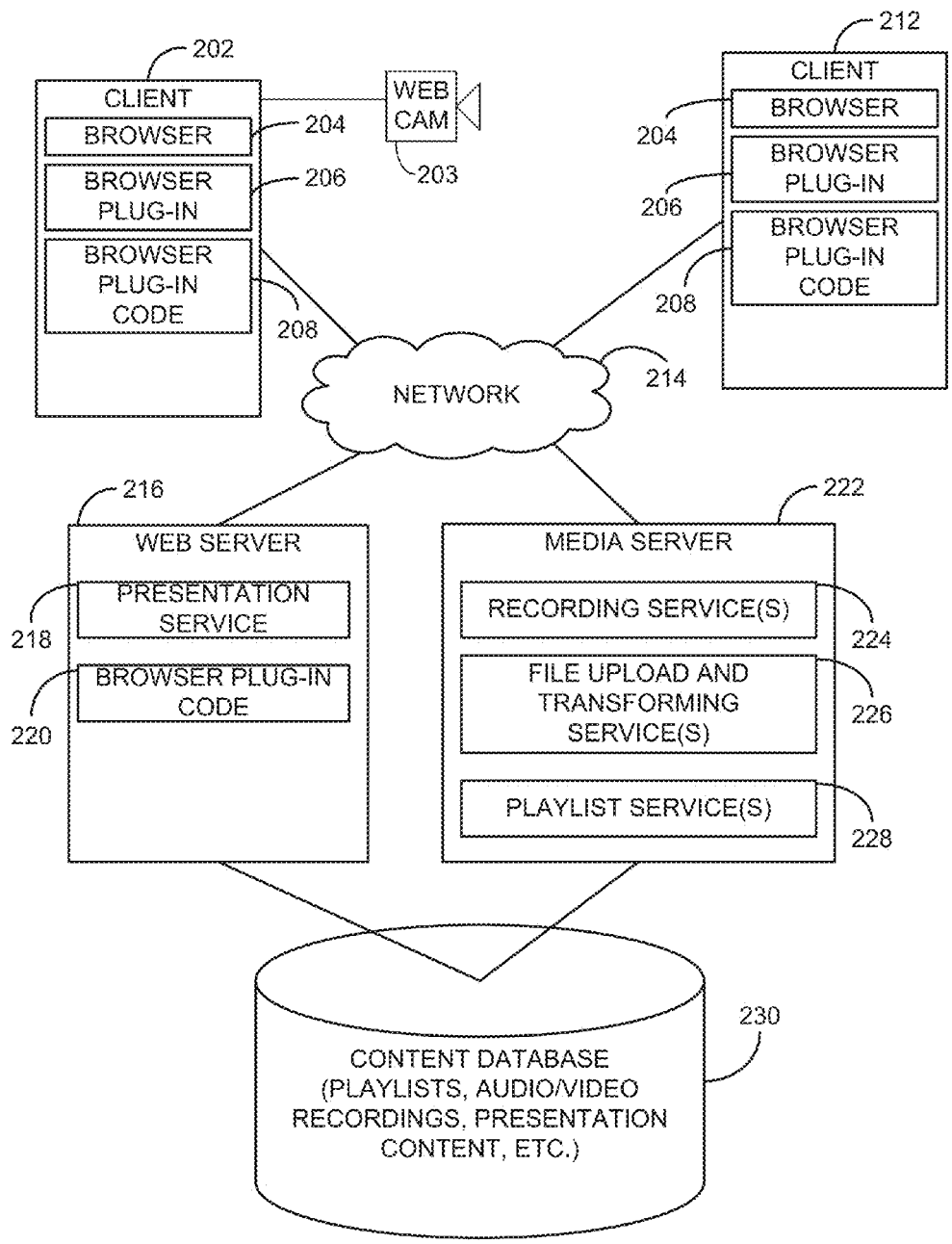
FIG. 2 is a block diagram of a system according to an example embodiment.

FIG. 2 is a block diagram of a system according to an example embodiment. The system includes two clients 202, 212 connected to a network 214. Also connected to the network 214 are a web server 216 and a media server 222. The web server 216 and media server 222 are examples of computing elements that may be included in the video messaging system 102 of FIG. 1 where a sender or other user desires to record a video for inclusion in a video message. Further, the clients 202, 212 are examples of the sender 130 and recipients 140, 142, 144 according to some embodiments.

The clients 202, 212 both include a web browser 204, such as INTERNET EXPLORER® available from Microsoft Corporation of Redmond, Wash., SAFARI® available from Apple, Inc. of Cupertino, Calif., Google® Chrome available from Google, Inc. of Mountain View, Calif., or other web browsing application. The clients 202, 212 also both typically include a browser plug-in 206. The browser plug-in 206, in some embodiments, is a FLASH® Player plug-in available from Adobe Corporation. However, in other embodiments, the plug-in 206 may be a Silverlight plug-in available from Microsoft Corporation, a QuickTime Player plug-in available from Apple, Inc., or other media player type plug-in. In still further embodiments, the functionality of the browser plug-in 206 may instead be native to the web browser 204 or other application through which a client 202, 212 interacts. In some embodiments, the client 202 is a client computer of a presentation presenter or moderator. In such embodiments, the client 202 includes a web cam 203 to capture audio and video of a presenter. In some embodiments, the client 212 and other clients that may be connected to the network 214 may also include a web cam.

As used herein, the term presenter is used interchangeably with the term moderator. Thus, the terms presenter and moderator should be construed similarly unless explicitly provided otherwise. The presenter or moderator are individuals recording videos for inclusion in a video message.

As illustrated, the client 202 is a client of a presenter. In such embodiments, a user of the client 202, when wanting to generate a recorded presentation, causes the web browser 204 of the client 202 to connect to one or both of the media server 222 and the web server 216 over the network 214. The web browser 204 will download browser plug-in code 220 from the web server 216 and cache the browser plug-in code 208 on the client 202, 212. The browser plug-in code 208 is operable within the browser 204 to instantiate the browser plug-in 206 within the web browser 204. The browser plug-in code 208 may include ActionScript which is operable within a Flash Player plug-in. However, the browser plug-in code 208 may be other types of code or script depending on the browser plug-in and media server 222 services implemented in a particular embodiment.

The browser plug-in code 208 is operable within the browser plug-in 206 to generate and present user interfaces to the client 202 user. Such user interfaces are operable to receive input from a presenter while authoring a recorded presentation. The browser plug-in code 208 is further operable to communicate some or all of the received input over the network to the media server 222.

The media server 222, in some embodiments, provides services that may be called by browser plug-in code 208 on the clients 202, 212. The services that the media server 222 provides may include one or more presentation recording services 224, one or more file upload and transforming services 226, one or more playlist services 228, and other services depending on the particular embodiment.

The recording services 224 are operable on the media server 222 to receive various types of media and data over the network 214 from one or more of the clients 202, 212. In some embodiments, the recording services 224 are operable to receive audio and video data, synchronization data that synchronizes presented materials, such as slides of a slide presentation, with the audio and video data, and other data. This data, when received for a particular presentation, may be stored in a content database 230 in an associative manner with other data of the particular presentation.

The file upload and transforming services 226 include services to receive presentation content files from a presenter, such as from the client 202, and to store the presentation content files in the content database 230. However, in some embodiments, the presentation content files may be received from the client 202 in a form that is not compatible for display with the client 202, 212 browser plug-ins 206. In such embodiments, the file upload and transforming services 226 are operable to receive presentation content files in various formats and transform them into a format that is compatible with the browser plug-in 206. For example, a video may be uploaded to the content database 230 via the file upload and transforming services. However, the video may be received from the client 202 in a format that is not compatible with the browser plug-in, such as in an MPEG format. The video file may be transformed by the file upload and transforming services 226 into a format, such as the FLV Flash video format which is compatible with the Flash Player plug-in. This transformation may be performed using one of many video transformation services that are provided in various software packages. One such example is available from the FFMPEG group at http://ffineg.mplayerhq.hu.

In some embodiments, documents, such as slide presentation, word processing documents, and other document types, may also be converted to a format that is compatible for display within the browser plug-in 208. For example, in embodiments where the browser plug-in 208 is a Flash Player plug-in, each page of the document may be converted to the Portable Document Format ("PDF") as set by Adobe Corporation using an Adobe Acrobat program on the media server 222. Each page converted to the PDF format may then be transformed into an image, such as a SWF image that is compatible with the Flash Player plug-in. This transformation may be performed using tools available from Adobe Corporation or other tools such as the pdf2swf software tool available at http://www.swftools.org. The converted video and document pages may are then stored in the content database 230.

The playlist services 228 are operable on the media server 222 and are containers for content held in the content database 230. In some embodiments, a presenter, such as a user of the client 202, may generate a playlist including content that the user uploaded to the content database 230. The playlist may include images of slides, such as SWF images generated from a Microsoft PowerPoint presentation document uploaded via the file upload and transforming servers 226, and images of other documents. The playlist may also include videos uploaded to the content database and other content types.

Such a playlist may be presented on the client 202 within the web browser 204 browser plug-in 206 using a portion of the browser plug-in code 208. The playlist when presented to the client 202 user may allow the user to specify an order of the content within the playlist. Data representative of that order may be communicated to the playlist services 228 and stored in the content database 230 or other location accessible to the media server 222. The playlist services 228 may also be operative to perform other functions.

The web server 216 is operable to communicate with the clients 202, 212 over the network 214 to provide browser plug-in code 220, presentation services 218, to serve data from the content database 230, and other purposes. In some embodiments, if a client 212 user wishes to view a recorded presentation such as when the user receives a message notification of a video message, the client 212 browser may select a video message link included in the message to view a presentation from the web server 216. The web server 216 provides the browser plug-in code 220 to the client 212, which locally caches the browser plug-in code 208 and executes the browser plug-in code 208 within the browser plug-in 206. The web server 216 via the presentation services 218 then retrieves the recorded presentation from the content database 230 and transmits it to the client 212 for presentation to the user of the client 212. The presentation may be retrieved from the content database 230 and provided to the client 212 in various ways. In one embodiment, a configuration file is retrieved and sent to the client 212. The configuration file may include data identifying a presenter video of a presenter to display in a first portion of a presentation-viewing interface and identify content images and videos to display in a second portion of the presentation-viewing interface at particular times with regard to the presenter video. The browser plug-in code may parse this configuration file and retrieve the presenter video display the video in the first portion of the presentation-viewing interface. The browser plug-in may further retrieve the content images and video and display them in the second portion of the presentation-viewing interface at the respective identified times during the playing of the presenter video. In some embodiments, rather than providing the video, the web server 216 may provide a redirect to another network accessible location from which the video may be retrieved. However, in each of these embodiments, upon receipt of the video or presentation request, the web server 216 or a service that executes thereon will record data associated with the request including data identifying the requestor as embedded in the selected link and other data including a time of day of the request and ancillary data included in the request. The ancillary data may include data identifying an application used to request the video, such as a web browser, a referring site, such as a social networking website where the link was provided, and other data.

Figure 3:
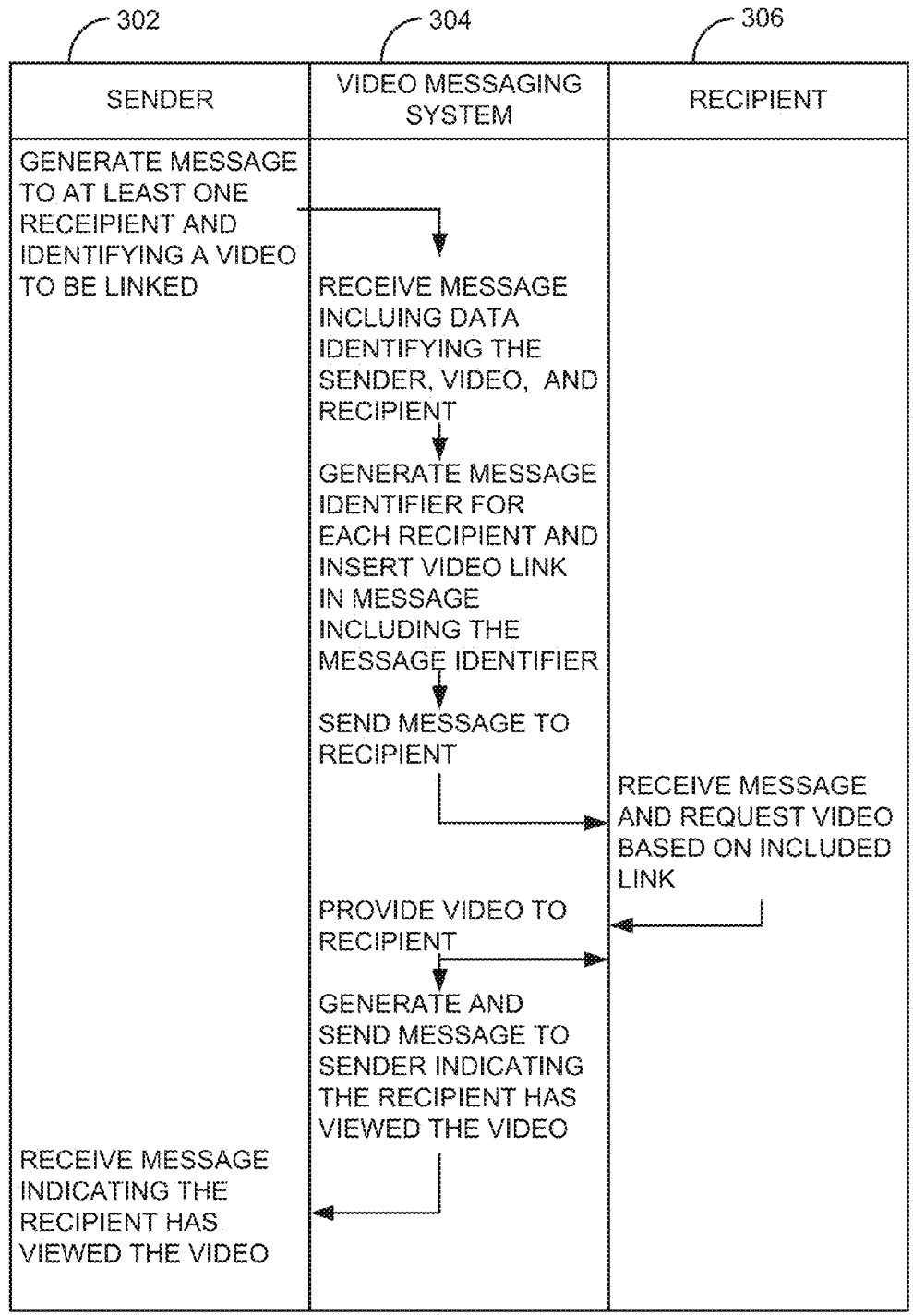
FIG. 3 is a flow diagram of a method, according to an example embodiment.

FIG. 3 is a flow diagram of a method, according to an example embodiment. The method of FIG. 3 is an example of a method that shows generation of message by a sender 302, such as sender 130 of FIG. 1, through interaction with a video messaging system 304, such as video messaging system 102 of FIG. 1, to a recipient 306, such as one of the recipients 140, 142, 144 of FIG. 1. The method of FIG. 3 includes the sender 302 generating a message to at least one recipient 306 and identifying a video to be linked to in the message. Generating the message typically includes providing a text portion inviting the recipient to view the linked message. Identifying a video to be linked to in the message may include selecting a video from a listing of available videos. The sender 302 then sends the message to the video messaging system 304.

The video messaging system 304, upon receipt of the message from the sender 302, generates a message identifier for each recipient 306 the message is addressed to and inserts a video link, such as a URL, in the message including a video identifier and a message identifier. When the link is eventually selected by a recipient 306, the video will be retrievable and the message identifier will link the request back to the particular recipient 306 that selected the link in the message and the sender 302 that sent the message. The message identifier is stored by the video messaging system 304 in a database associating the message to the video, the sender 302, and the recipient 306. The message is then sent by the video messaging system 304 to each of the intended recipients 306.

The one or more recipients 306 may then receive the message. When a recipient views the received message, the recipient 306 selects the link to request the video. The link is sent back to the video messaging system 304, and as mentioned above, includes a video identifier and a message identifier. The video messaging system 304, upon receipt of video request from the recipient based on the link, retrieves the identified video and provides the video to the recipient. The video messaging system 304, based on the message identifier included in the link, queries the database to identify the recipient 306 that requested the video and the sender 302 who sent the message. A message is then generated by the video messaging system 304 identifying the requested video and the recipient 306 who requested the video and the message is sent to the sender 302. Such embodiments provide rapid feedback to the sender 302 of recipients who have viewed a sent video message.

Figure 4:
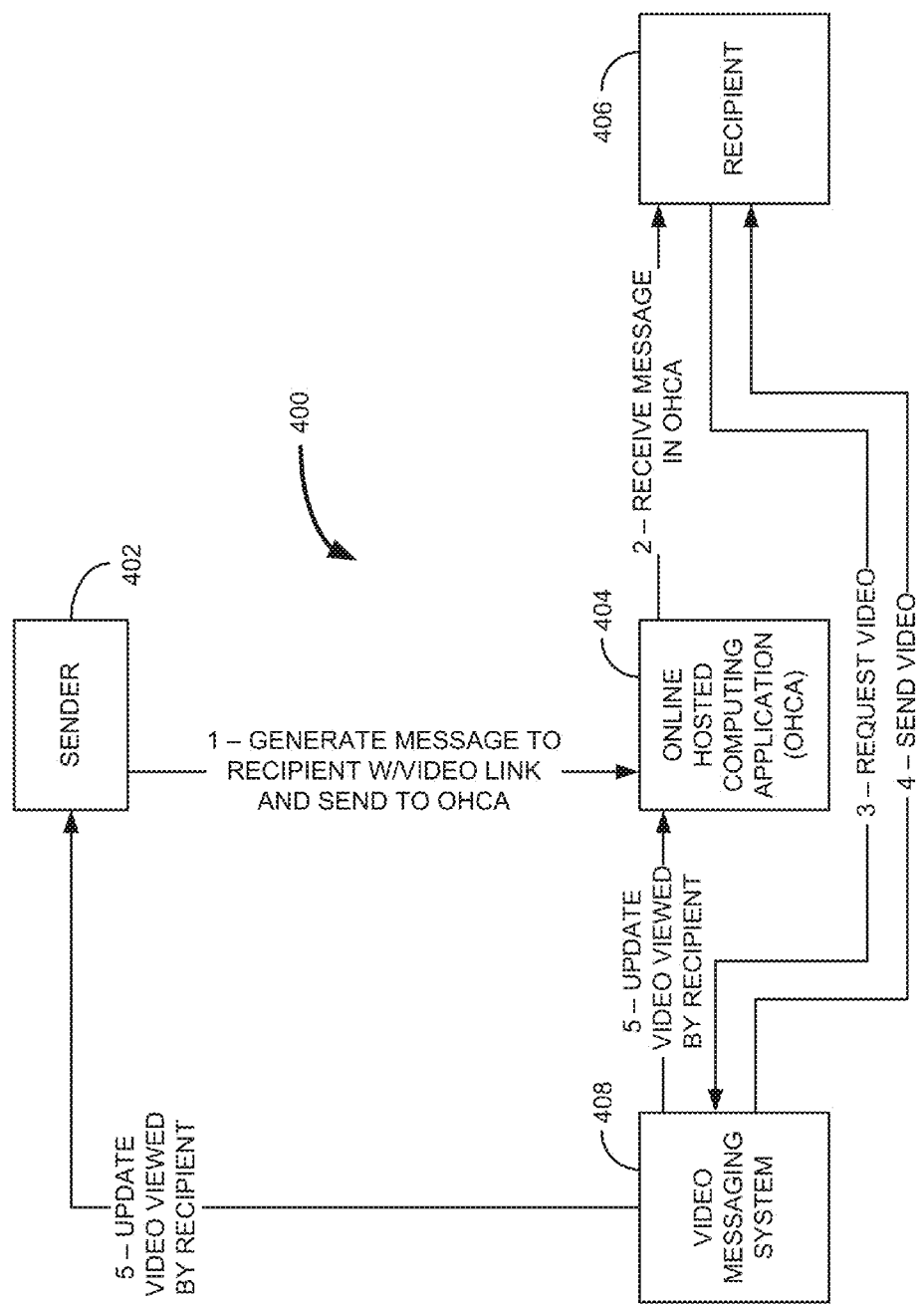
FIG. 4 is a flow diagram of a method, according to an example embodiment.

FIG. 4 is a flow diagram of a method 400, according to an example embodiment. The method 400 is an example method where a sender 402 sends a message to a recipient via an online hosted computing application (OHCA) 404, such as a social media website. The method 400 includes the sender 402 first generating a message to a recipient with a video link for a recipient 406. The sender 402 may generate the message directly within the OHCA 404, through an OHCA app that executes on a computing device such as a smartphone, or through a video messaging system 408 integrated to communicate with services of the OHCA 404. In each of these embodiments, the link to the video is generated by the video messaging system 408 and either copied from the video messaging system 408 manually by the sender 402, by a process of the video messaging system 408, or inserted by the video messaging system 408 by a process of the video messaging system 408 integrated with the OHCA 404. The link includes data associated with stored data in the video messaging system 408 associating the link to a video the sender 402 is sending to the recipient 406, an identifier of the sender 402, and an identifier of the recipient 406. The data included in the link may be visible or may be obfuscated, such as by applying a hashing algorithm to a portion of the link.

The OHCA 404 upon receipt of the message provides the message to the recipient 406 as with any message sent via the OHCA 404. This typically involves the recipient 406 receiving the message when visiting the OHCA 404 web site, via a push notification to an OHCA 404 app that executes on a computing device (e.g., a smartphone) of the recipient, a notification email or text message, or other messaging platform depending on the OHCA 404.

Upon receipt of the message, the recipient 406 may select the included link to request the video. The video messaging system 408 will receive the video request and reply by sending the requested video to the recipient 406. The video may be streamed or sent as a file, depending upon the particular embodiment. The video messaging system 408 upon receipt of the video request from the recipient 406 will also utilize the data included in the link that associates the link with the identifier of the sender 402 and recipient 406 to generate and send a message to the sender 402 notifying the sender 402 that the recipient has viewed the video. This message may be sent to the sender 402 via the OHCA 404, email, text message, chat message, or other messaging platform.

Figures 5, 6:
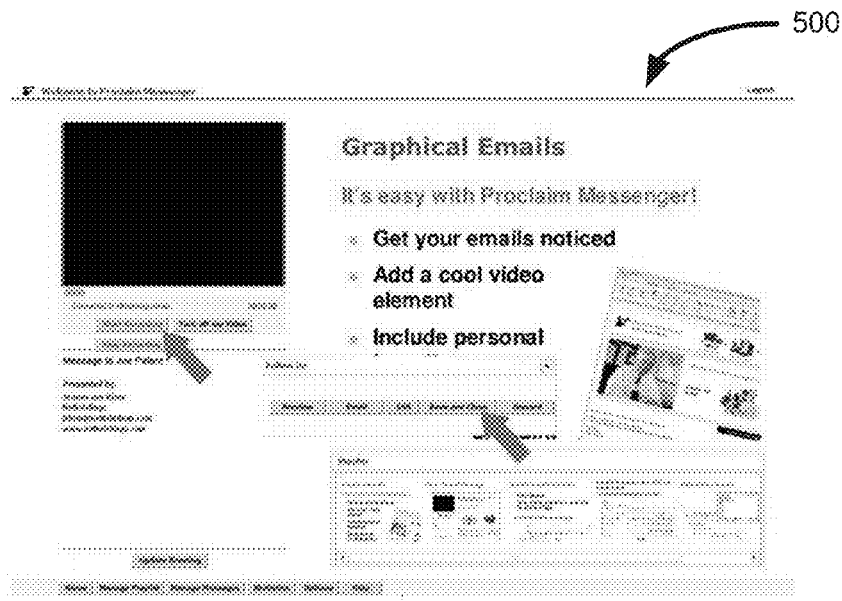
FIG. 5 is a user interface illustration, according to an example embodiment.
FIG. 6 is a user interface illustration, according to an example embodiment.

FIG. 5 is a user interface illustration 500, according to an example embodiment. The user interface 500 is an example of a user interface that may be used to record a video, such as described with regard to the system of FIG. 2, and to send enter a process of generating a message to one or more recipients including a link to a video. The user interface 500 includes controls for recording and storing video and emailing video in the form of a message as described herein. Although the user interface includes only a single control to generate an email, other embodiments may include additional user interface controls to send messages via other messaging platforms, such as an OHCA 404 as discussed above with regard to FIG. 4, text message (e.g., SMS), among others. Yet further embodiments may alternatively include only a single user interface control as illustrated in the user interface 500 that is for sending messages via a messaging platform other than email.

FIG. 6 is a user interface 600 illustration, according to an example embodiment. The user interface 600 includes a listing of recorded video messages. Each message in the user interface 600 includes a set of links to perform actions with regard to the respective message. These actions include view, email, lead track, edit, post, and delete. Selecting email, or another messaging platform that might be listed in other embodiments, allows the user to send a link to the respective video message in an email, or other message type, such as illustrated and described with regard to FIG. 3. The user selects the "Email" link and then is provided with the option to enter recipients. Selection of the "Lead Track" link provides the user with the ability to send a respective video message to many recipients as may be specified in file that can be uploaded to the video messaging system.

Figure 7:
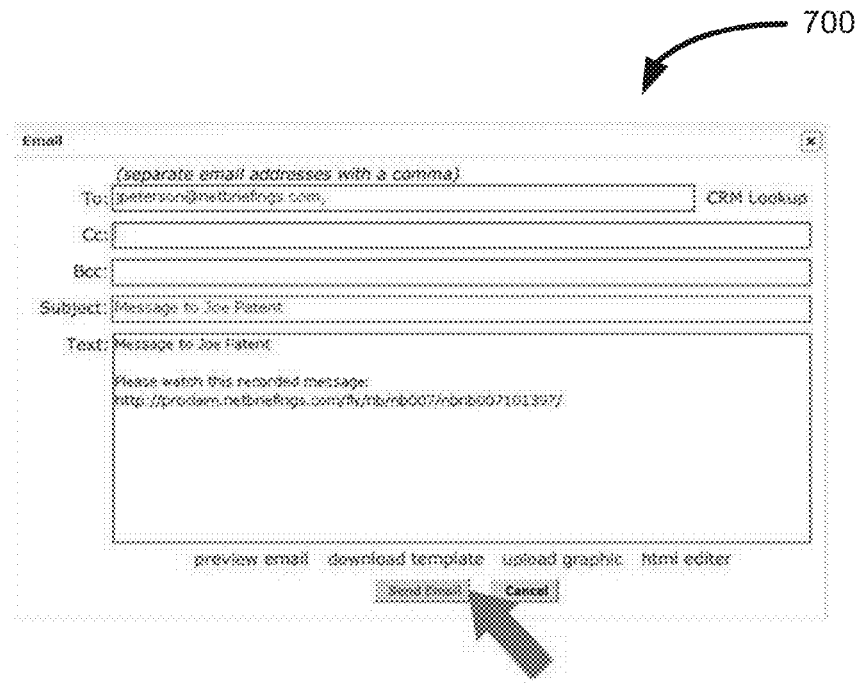
FIG. 7 is a user interface illustration, according to an example embodiment.

FIG. 7 is a user interface 700 illustration, according to an example embodiment. The user interface 700 is an email generation user interface that is displayed in some embodiments upon selection of the "Email" link with regard to a particular video message in the user interface 600 of FIG. 6. The text of the email may be edited, but includes a link to a web address from which the recipient may request to view the video message. Note the included message text includes identifying data in the link to associate the link to the particular video, the sender, and the particular recipient.

The user interface 700 also includes a "CRM Lookup" control. This control, in some embodiments, allows a user to retrieve a listing of contacts from a CRM application, which may be an OHCA, such as SALESFORCE.COM, a CRM application that executes on a local network, or a CRM application that executes locally to a computing device providing the user interface 700.

Figure 8:
FIG. 8 is a user interface illustration, according to an example embodiment.

FIG. 8 is a user interface 800 illustration, according to an example embodiment. The user interface 800 provides an example recipient view of an email message including a link to a video message according to some embodiments herein. The recipient may select the included link, the graphic, or other linked item in the presented email to view the video message.

Figure 9:
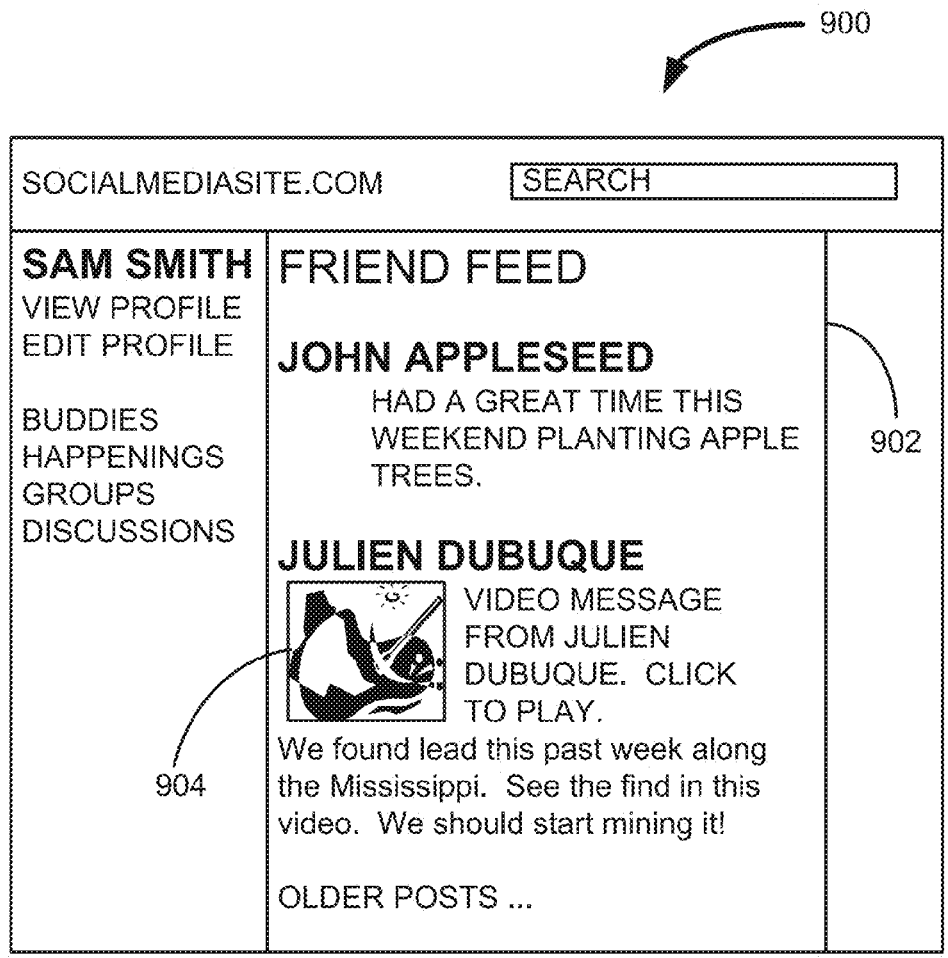
FIG. 9 is a user interface illustration, according to an example embodiment.

FIG. 9 is a user interface 900 illustration, according to an example embodiment. The user interface 900 is an example of how a message 902 sent via a social media messaging platform may appear to a recipient when received. The message 902 is presented within the social media interface, such as a user interface within a web browser or an app that executes on a computing device, such as a smartphone. The message 902 presentation generally will include message text and an image 904 representative of the video of the video message. The message 902 or image 904 may be selected to view the message. Selection of the message 902 or image 904 may cause the image to be replaced by a video viewer, which presents the video message. In some embodiments, selection of the message 902 or image 904 may cause a video viewer to open or another browser window to open which will then provide a view of the video message.

Figure 10:
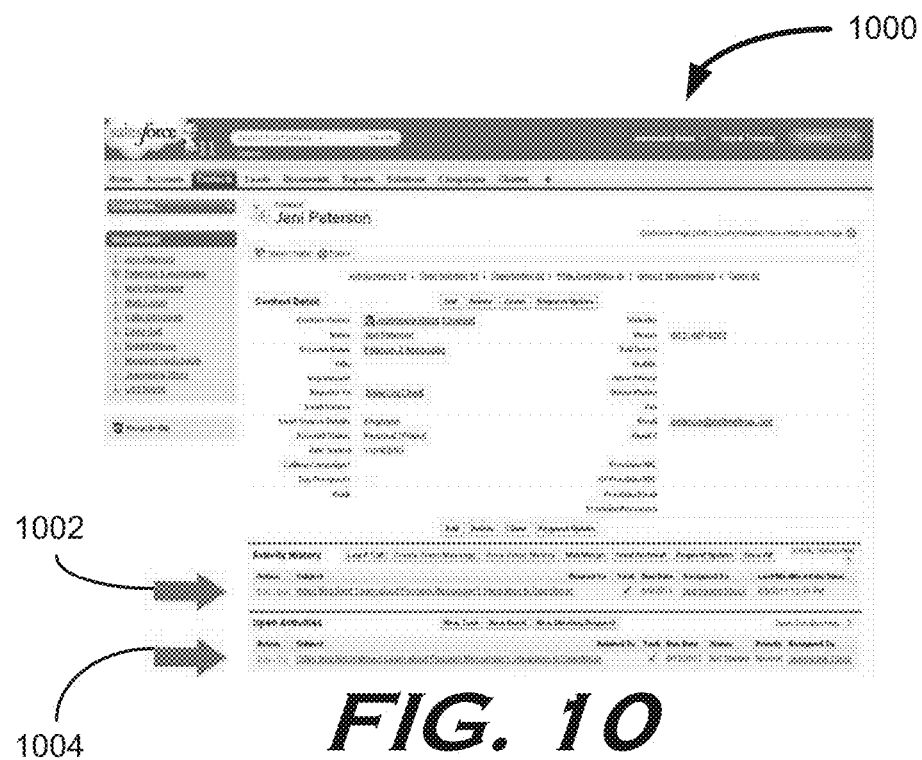
FIG. 10 is a user interface illustration, according to an example embodiment.

FIG. 10 is a user interface illustration 1000, according to an example embodiment. The user interface 1000 is an example of a user interface within an OHCA CRM application that presents data and activities with regard to a contact or prospect within the application. In some embodiments, as discussed above, the described video messaging systems may be integrated with such OHCA CRM systems for sending message and tracking activities. For example, when a message is sent via the OHCA CRM application or via a video messaging system including services to update data therein, a contact activity 1002 identifying a sent message can be generated. In some embodiments, upon a message being sent, a follow up activity 1004 can also be generated that will remind the sender or the sender's organization to follow-up with the recipient after a certain period if the video has not been viewed by the recipient. Thus, when a recipient views the message, such integrated embodiments may include the video messaging system updating the OHCA CRM application in addition to or instead of notifying the sender. A follow-up activity may also, or alternatively, be generated upon a recipient viewing a particular message. For example, if a video message viewed by a recipient is with regard to a product being marketed, an open activity for follow-up with the recipient can be generated for contacting the recipient again after a period to continue the marketing effort with regard to the product.

Figure 11:
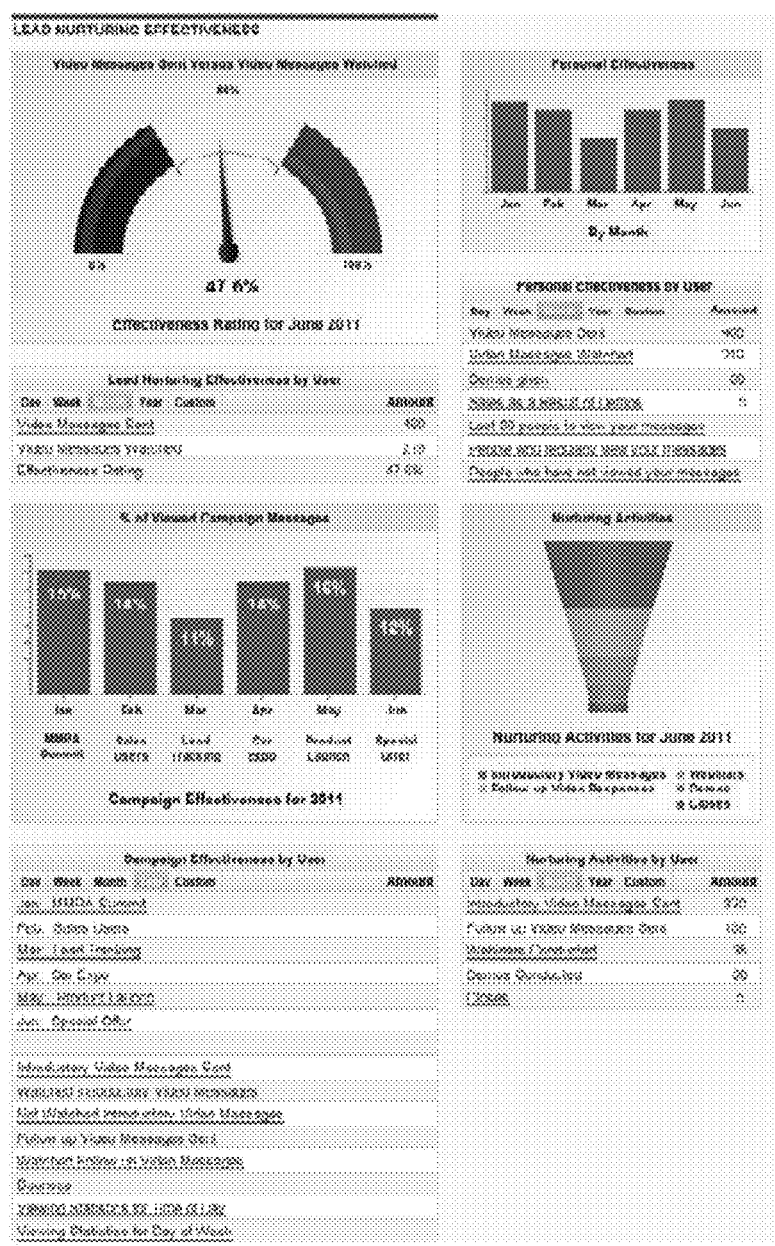
FIG. 11 is a user interface illustration, according to an example embodiment.

FIG. 11 is a user interface illustration 1100, according to an example embodiment. The user interface 1100 provides an example dashboard view of video messaging statistics. As messages are sent and video messages are viewed, data is recorded by the video messaging system, such as video messaging system 102 of FIG. 1. The data recorded may include some or all of data identifying senders, recipients, videos sent, dates and time when videos are sent, and whether a video sent was a custom video or a standard video. Video messaging systems may also record data received with video requests from recipients. This data can identify dates and times videos are requested, applications used to request videos and version identifiers thereof, referring sites for the video requests, globally unique identifiers (GUID) of systems used to request and view videos, operating system identifying data, and other data that is readily accessible via http and https requests received over the internet as is well known in the relevant art. This data may be used to generate dashboard views of video messaging activity. This data may be presented with regard to particular senders, senders within particular company departments, messages with regard to a particular product, messages sent within certain periods, and other forms generally limited only by the granularity at which the data is either received or recorded.

In some embodiments, this data may be used for additional purposes. For example, data mining may be performed to identify a way to send a video message to a particular recipient that increases the likelihood the message will be watched. The data mining may reveal that the particular recipient views a high percentage of messages sent via a particular social media platform between 12:01 PM and 1:00 PM on weekdays. The data mining with regard to the same recipient may also reveal that video messages sent via email are rarely viewed regardless of when they are sent. This information may then be utilized in sending message to the particular recipient to set a parameter to send video messages from the video messaging system only within a 12:01 PM and 1:00 PM weekday window. This data mining may be performed with regard to many or all recipients in the video messaging system and for many purposes to help increase the effectiveness of video messaging in marketing efforts.

Figure 12:
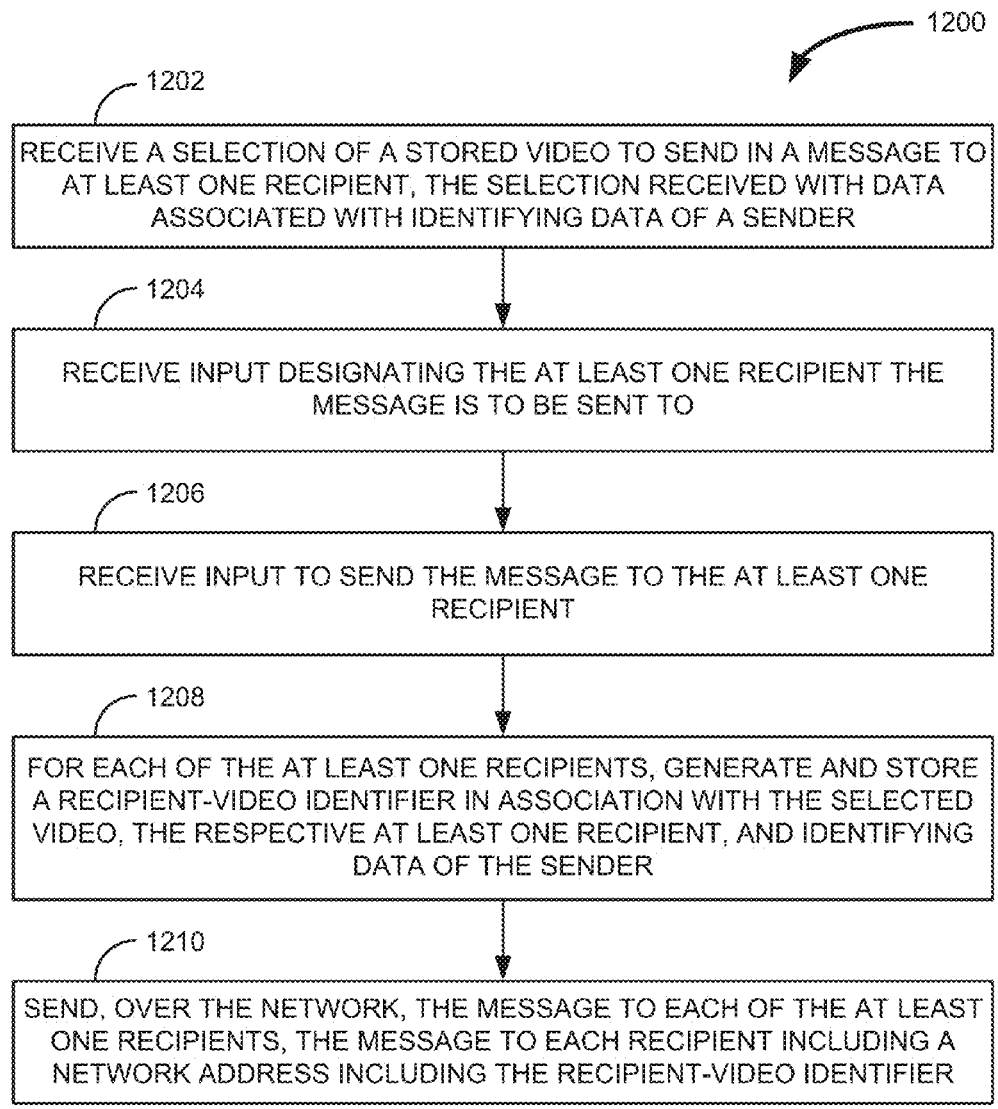
FIG. 12 is a block flow diagram of a method, according to an example embodiment.

FIG. 12 is a block flow diagram of a method 1200, according to an example embodiment. The method 1200 is a method 1200 of generating a message including a link to a video message, such as may be performed by a video messaging system. The method 1200 includes receiving 1202 a selection of a stored video to send in a message to at least one recipient including data identifying a sender. The method 1200 further includes receiving 1204 input designating the at least one recipient the message is to be sent to and receiving 1206 input to send the message to the at least one recipient. Next, for each of the at least one recipients, the method 1200 includes generating and storing 1208 a recipient-video identifier in association with the selected video, the respective at least one recipient, and identifying data of the sender. The recipient-video identifier is data that uniquely identifies the video being sent to the recipient and is associated with data identifying the sender. This data is later used for tracking the sent video, for notifying the sender when the recipient has viewed the video, for data mining, and for other purposes depending on the particular embodiment. The method 1200 additionally includes sending 1210 the message to each of the at least one recipients, the message to each recipient including a network address including the recipient-video identifier. Thus, when a recipient requests the video utilizing the network address including the recipient-video identifier, the video messaging system can identify which video is requested by which recipient for the purposes discussed above.

In some embodiments of the method 1200, receiving 1202 the selection of the stored video includes a selection of a video-based event that has not yet occurred, such as a webinar. While certain portions of the video may be previously stored, such as data identifying the webinar as a future event, not all video data need be previously stored. Thus, the message sent through operation of the method 1200 may, in some embodiments, be an invitation to a future video-based event.

Some embodiments of the method 1200 further include receiving at least one of text and additional content to be included in the message when sent to each of the at least one recipients. The text may be text of a message introducing the video or purpose therefore to the recipient. The additional content may include graphics and images such as company logos, a picture of a sender, graphic embellishments, and other content.

In some embodiments, receiving 1204 input designating the at least one recipient the message is to be sent to includes receiving input with regard to one or more of the at least one recipients designating a mode of sending the message to the respective at least one recipient. A mode of sending the message may identify a messaging platform over which to send the message such as email, text message (e.g., SMS, MMS, etc.), chat message, an OHCA application such as a social media website, and other messaging platforms. The mode of sending the message may also include invoking a data mining process that executes to identify messaging parameters that are likely the most effective with regard to the particular recipient. For example, data may be recorded with regard to previous interactions with the targeted recipient as discussed above. The data mining process in such embodiments can be invoked to reveal a messaging platform and time of day for sending the message to the targeted recipient that will be most effective in getting the recipient to watch the video message. In various embodiments, this mode may be invoked with regard to individual recipients or with regard to all recipients, to whom a message is to be sent.

In further embodiments of the method 1200, receiving 1202 a selection of a stored video includes receiving a selection of a standard message to be included in the message sent to each of the at least one recipients. For example, a message that is not specific to one recipient can be sent in a message to each of the at least one recipient. The message may be a holiday greeting, a product overview, or other such message. This is in contrast to a message that would be specific to a particular recipient that might refer to the recipient by name.

Figure 13:
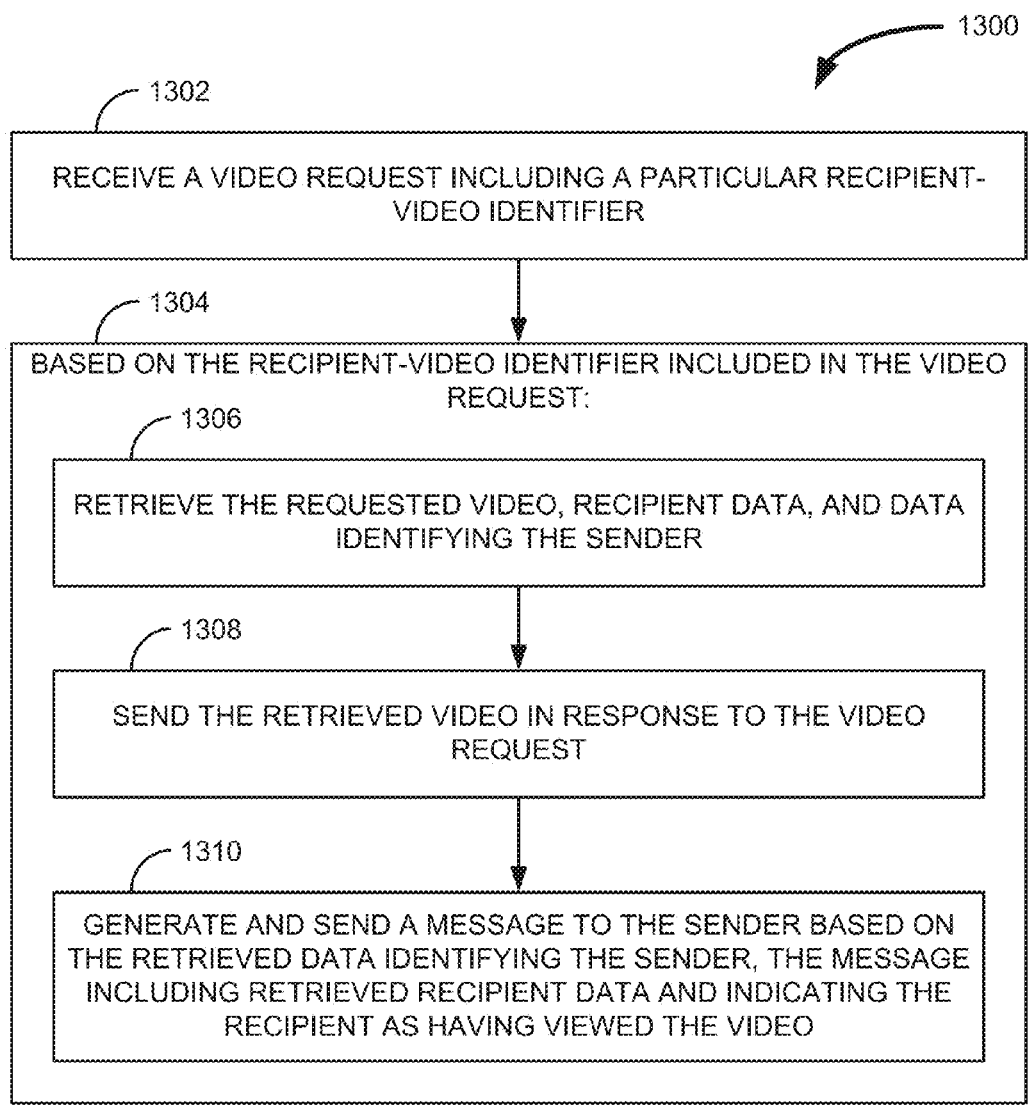
FIG. 13 is a block flow diagram of a method, according to an example embodiment.

FIG. 13 is a block flow diagram of a method 1300, according to an example embodiment. The method 1300 is a method 1300 of receiving, processing, and responding to a video request as may be performed by a video messaging system in response to a message sent according to the method 1200 of FIG. 12. The method 1300 includes receiving 1302 a video request including a particular recipient-video identifier. At block 1304, based on the recipient-video identifier included in the video request, the method 1300 includes retrieving 1306 the requested video, recipient data, and data identifying the sender and sending 1308 the retrieved video in response to the video request. The method 1300 further includes generating and sending 1310 a message to the sender based on the retrieved data identifying the sender, the message including retrieved recipient data and indicating the recipient as having viewed the video. In some embodiments, the method 1300 includes receiving, with the video request, requesting client property data identifying properties of a client application the video request was received from, such an identifier of a web browser.

Figure 14:
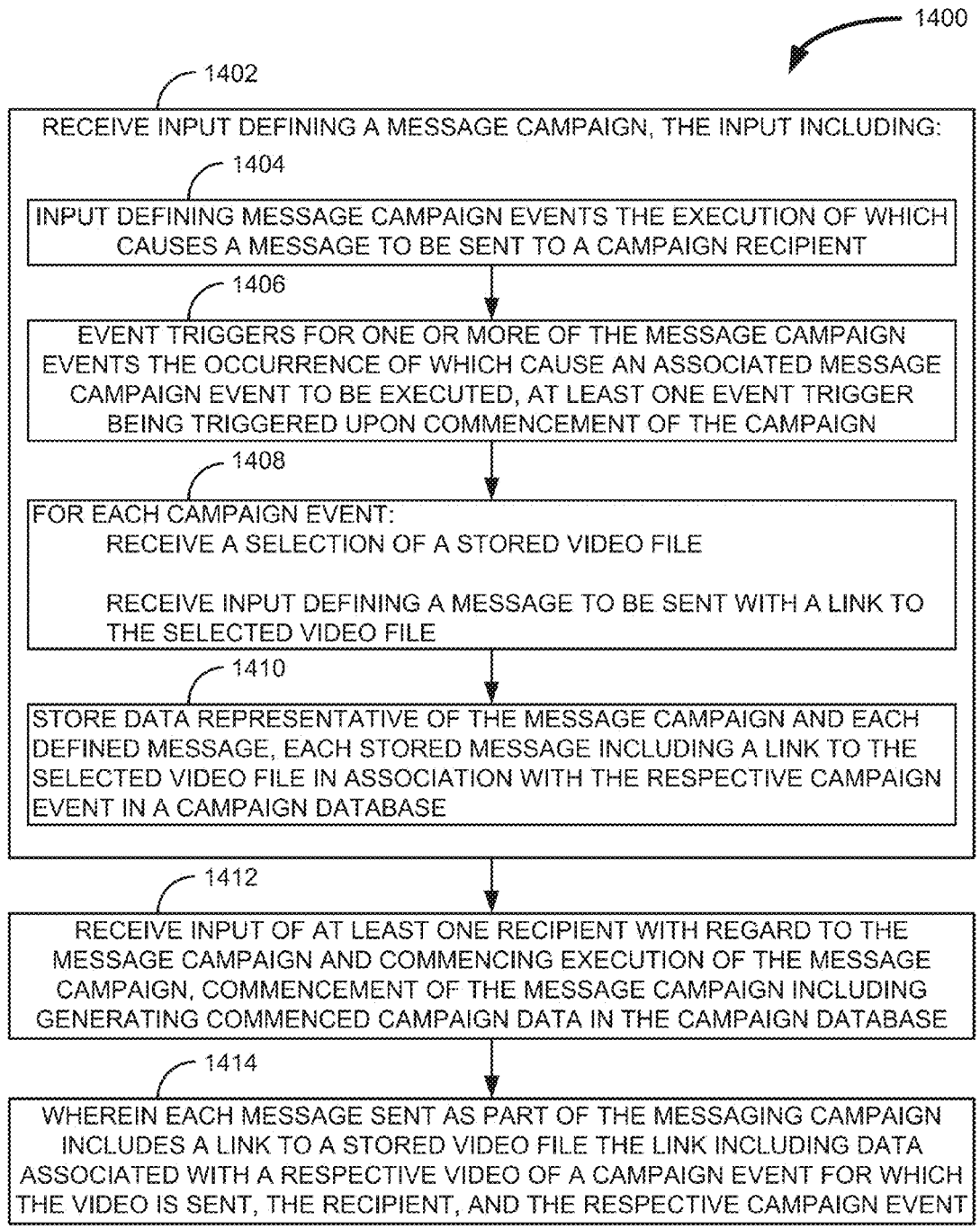
FIG. 14 is a block flow diagram of a method, according to an example embodiment.

FIG. 14 is a block flow diagram of a method 1400, according to an example embodiment. The method 1400 is a method of defining a marketing campaign in a system, such as a video messaging system, a CRM system, or other software application. A campaign as referred to herein is a set of one or more rules that define when to and what messages including video message links are to be sent and to whom. The rules may be defined by an administrator or user of such a system.

In some embodiments, the method 1400 includes receiving 1402 input defining a message campaign. The received 1402 input, in some embodiments, includes input 1404 defining message campaign events the execution of which causes a message to be sent to a campaign recipient and event triggers 1406 for one or more of the message campaign events the occurrence of which cause an associated message campaign event to be executed. However, in some other embodiments, receiving 1402 input defining a message campaign includes receiving selection input selecting a previously define message campaign for execution. In such embodiments, commencement of a message campaign triggers at least one event trigger, which causes initial message campaign messages to be sent.

At block 1408, receiving input defining a message campaign includes, for each campaign event, receiving a selection of a stored video file and receiving input defining a message to be sent with a link to the selected video file. The receiving 1402 of input defining a message campaign further includes storing 1410 data representative of the message campaign and each defined message, each stored message including a link to the selected video file in association with the respective campaign event in a campaign database.

The method 1400 continues in such embodiments by receiving 1412 input of at least one recipient with regard to the message campaign and commencing execution of the message campaign, commencement of the message campaign including generating commenced campaign data in the campaign database. In such embodiments, each message sent as part of the messaging campaign includes a link to a stored video file, the link including data associated with a respective video of a campaign event for which the video is sent, the recipient, and the respective campaign event.

Some embodiments may also include receiving a video request including data associated with a video, a recipient, and a campaign event. Based on the data associated with the video, the recipient, and the campaign event included in the video request, the method 1400 may retrieve the requested video based on the data associated with the video and send the retrieved video in response to the video request. In such embodiments, data is then stored in the campaign database with regard to the campaign associated with the received campaign event data indicating that the recipient identified by the received recipient data has viewed the campaign event video. Campaign event triggers may then be applied to the data stored in the campaign database to determine if a campaign event trigger is implicated and triggered campaign events may then be executed.

Figure 15:
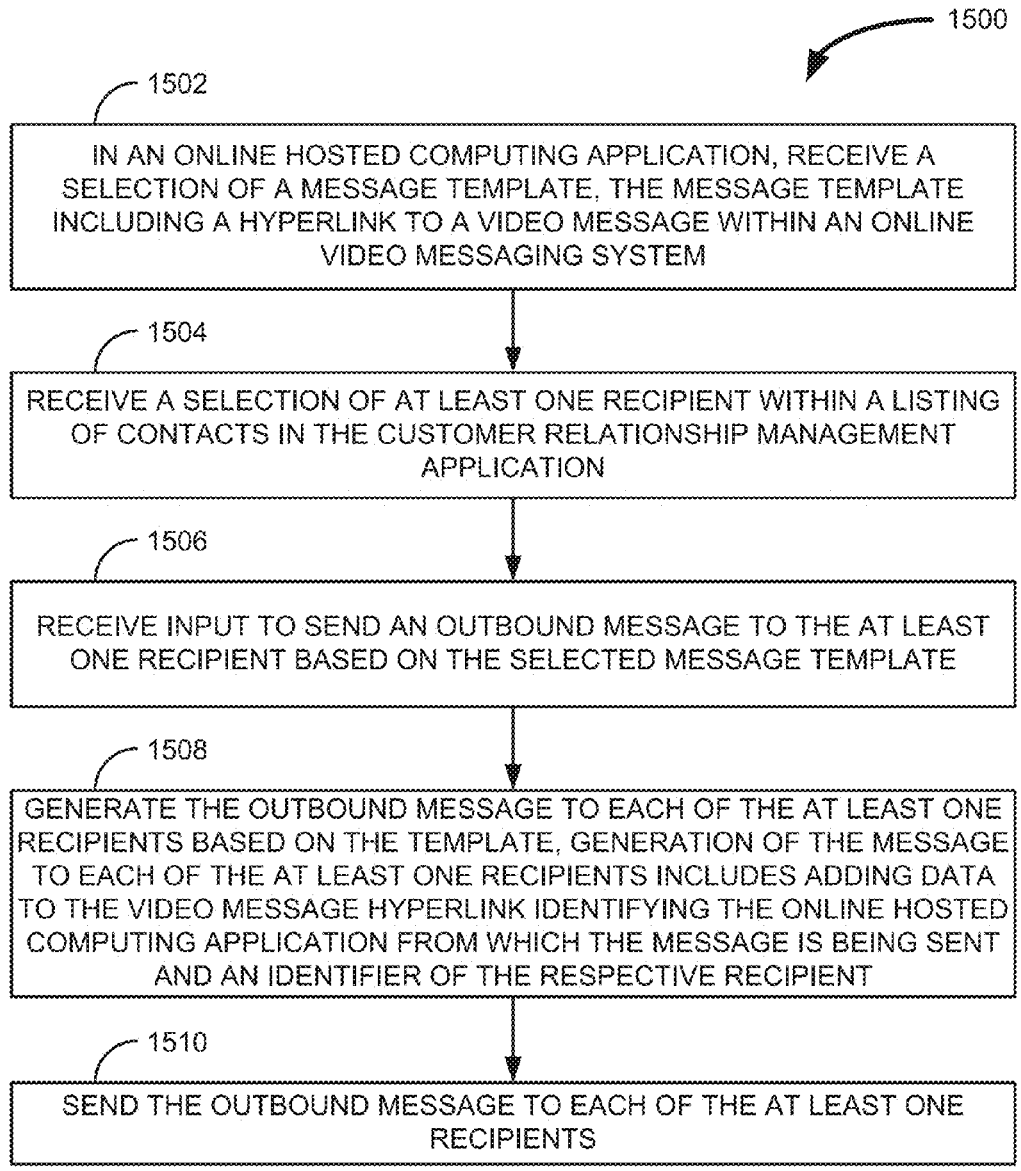
FIG. 15 is a block flow diagram of a method, according to an example embodiment.

FIG. 15 is a block flow diagram of a method 1500, according to an example embodiment. FIG. 15 illustrates an example of a method 1500 that may be performed within an OHCA or integrated with an OHCA, such as a hosted CRM application (e.g., SALESFORCE.COM) or a social media website (e.g., FACEBOOK®), to generate and send messages with regard to a video messaging system. The method 1500, in some embodiments, includes receiving 1502, in an OHCA, a selection of a message template including a hyperlink to a video message within an online video messaging system. In some embodiments, message templates are predefined messages that can be selected for sending to recipients. The method 1500 further includes receiving 1504 a selection of at least one recipient within a listing of contacts in the OHCA and receiving 1506 input to send an outbound message to the at least one recipient based on the selected message template. The method 1500 may then generate 1508 the outbound message to each of the at least one recipients based on the template. In some embodiments, generation of the message to each of the at least one recipients includes adding data to the video message hyperlink identifying the OHCA from which the message is being sent and an identifier of the respective recipient. The outbound message may then be sent 1510 to each of the at least one recipients.

Figure 16:
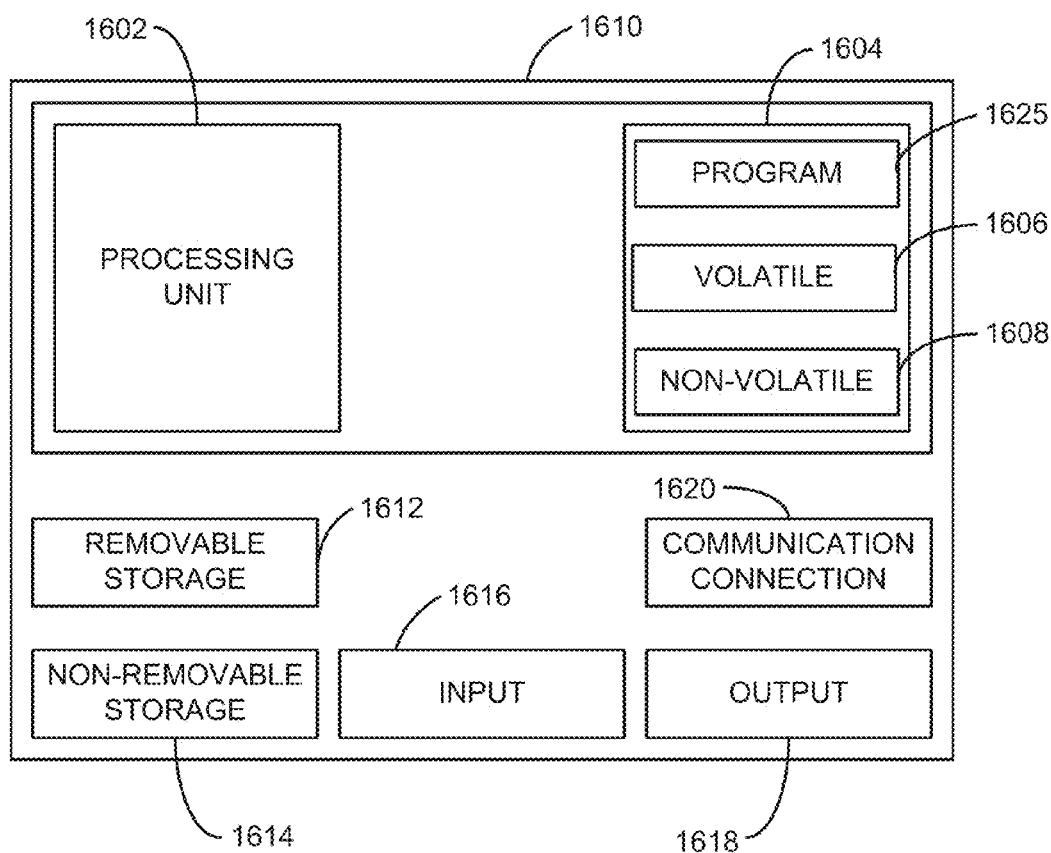
FIG. 16 is a block diagram of a computing device, according to an example embodiment.

FIG. 16 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 1610, may include a processing unit 1602, memory 1604, removable storage 1612, and non-removable storage 1614. Memory 1604 may include volatile memory 1606 and non-volatile memory 1608. Computer 1610 may include—or have access to a computing environment that includes—a variety of computer-readable media, such as volatile memory 1606 and non-volatile memory 1608, removable storage 1612 and non-removable storage 1614. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 1610 may include or have access to a computing environment that includes input 1616, output 1618, and a communication connection 1620. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 1602 of the computer 1610. A hard drive, CD-ROM, and RAM are some examples of articles including a computer-readable medium. For example, a computer program 1625 may be capable of performing or more of the methods illustrated and described herein, or portions thereof. Although a single computer program 1625 is illustrated, multiple computer programs 1625 may be included in various embodiments.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   receiving, over a network, a selection of a stored video to send in a message to at least one recipient, the selection received with data identifying a sender;
   receiving, over the network, input designating the at least one recipient the message is to be sent to;

receiving, over the network, input to send the message to the at least one recipient;

for each of the at least one recipients, generating and storing a recipient-video identifier in association with the selected video, the respective at least one recipient, and identifying data of the sender;

sending, over the network, the message to each of the at least one recipients, the message to each recipient including a network address including the recipient-video identifier;

receiving, over the network, a video request including a particular recipient-video identifier; and based on the recipient-video identifier included in the video request:

retrieving the requested video, recipient data, and data identifying the sender;

sending the retrieved video, over the network, in response to the video request; and generating and sending, over the network, a message to the sender based on the retrieved data identifying the sender, the message including retrieved recipient data and indicating the recipient as having viewed the video.

2. The method of claim 1, further comprising:

receiving at least one of text and additional content to be included in the message when sent to each of the at least one recipients.

3. The method of claim 1, further comprising:

generating activity data representative of at least one activity in a customer relationship management application, the at least one activity being a completed activity of sending the message to each of the at least one recipients and a follow-up activity.

4. The method of claim 1, further comprising:

receiving, with the video request, requesting client property data identifying properties of a client application the video request was received from; and storing the client property data, recipient data, and ancillary data regarding the video request in a viewed message database.

5. The method of claim 4, further comprising:

prior to sending the message to each of the recipients, executing a process with regard to each of the at least one recipients against the viewed message data to identify a mode of sending the message to each respective recipient.

6. The method of claim 4, further comprising:

receiving a request for a summary view of video messaging data; and providing a statistical summary of messages sent and watched with regard to messages sent by at least one sender, the statistical summary generated based at least in part on data stored in the viewed message database.

7. The method of claim 1, wherein receiving input designating the at least one recipient the message is to be sent to includes receiving input with regard to one or more of the at least one recipients designating a mode of sending the message to the respective at least one recipient.

8. The method of claim 7, wherein the input designating a mode of sending the message to the at least one recipient includes receiving input designating a social media platform over which the message is to be communicated to the respective at least one recipient.

9. The method of claim 1, wherein receiving a selection of a stored video includes receiving a selection of a standard message to be included in the message sent to each of the at least one recipients.

* * * * *